United States Patent
Chen et al.

(10) Patent No.: US 9,591,673 B2
(45) Date of Patent: Mar. 7, 2017

(54) METHOD AND APPARATUS FOR PROVIDING MACHINE INITIAL ACCESS PROCEDURE FOR MACHINE TO MACHINE COMMUNICATION

(75) Inventors: Tao Chen, Oulu (FI); Gilles Charbit, Farnborough (GB); Kari Juhani Rikkinen, Li (FI)

(73) Assignee: Nokia Technologies Oy, Espoo (FI)

( * ) Notice: Subject to any disclaimer, the term of this patent is extended or adjusted under 35 U.S.C. 154(b) by 540 days.

(21) Appl. No.: 13/640,305

(22) PCT Filed: Apr. 13, 2010

(86) PCT No.: PCT/IB2010/051597
§ 371 (c)(1),
(2), (4) Date: Oct. 9, 2012

(87) PCT Pub. No.: WO2011/128725
PCT Pub. Date: Oct. 20, 2011

(65) Prior Publication Data
US 2013/0028224 A1    Jan. 31, 2013

(51) Int. Cl.
*H04W 4/00* (2009.01)
*H04W 76/02* (2009.01)
(Continued)

(52) U.S. Cl.
CPC .......... *H04W 76/02* (2013.01); *H04W 4/005* (2013.01); *H04W 72/12* (2013.01); *H04L 1/0045* (2013.01);
(Continued)

(58) Field of Classification Search
CPC combination set(s) only.
See application file for complete search history.

(56) References Cited

U.S. PATENT DOCUMENTS 5,559,804 A * 9/1996 Amada et al. ............... 370/347
8,301,760 B1 * 10/2012 Zadicario ............ H04L 12/2803
709/224

(Continued)

FOREIGN PATENT DOCUMENTS

| CN | 1723666 A | 1/2006 |
| EP | 1976316 A1 | 10/2008 |

(Continued)

OTHER PUBLICATIONS

Office action received for corresponding Chinese Patent Application No. 201080066131.X, dated Oct. 11, 2014, 7 pages of office action and No English Language translation available.

(Continued)

*Primary Examiner* — Jutai Kao
(74) *Attorney, Agent, or Firm* — Mintz Levin Cohn Ferris Glovsky and Popeo, P.C.

(57) ABSTRACT

A method and apparatus are therefore provided that may enable the provision of M2M communication in a wireless network environment. In this regard, for example, relatively low power devices (specifically referencing low transmission power) such as sensors or other machines in an M2M system may be enabled to initiate communication with a network through a mobile terminal in a more reliable and robust manner. The machine may transmit a busy-signal to request a reservation of a machine access slot on a machine access control channel to reserve the slot before transmitting any machine information or data to reduce the likelihood of collisions with other machines. Once the machine has reserved the machine access slot, the machine may transmit identification information via randomly selected frequency division multiplexed or code division multiplexed resources to further reduce the likelihood of collisions with other (Continued)

machines. Thus, delays in establishing connections may be reduced or eliminated.

22 Claims, 10 Drawing Sheets

(51) Int. Cl.
*H04W 72/12* (2009.01)
*H04W 72/04* (2009.01)
*H04W 28/26* (2009.01)
*H04W 92/18* (2009.01)
*H04L 1/00* (2006.01)
*H04W 74/08* (2009.01)
*H04W 84/18* (2009.01)
*H04W 88/04* (2009.01)

(52) U.S. Cl.
CPC ........ *H04W 28/26* (2013.01); *H04W 72/0406* (2013.01); *H04W 74/0816* (2013.01); *H04W 84/18* (2013.01); *H04W 88/04* (2013.01); *H04W 92/18* (2013.01)

(56) References Cited

U.S. PATENT DOCUMENTS

| | | | |
|---|---|---|---|
| 2001/0052017 A1* | 12/2001 | Chen ................... | H04L 12/5695 709/226 |
| 2005/0074025 A1 | 4/2005 | Shao et al. | |
| 2006/0153107 A1 | 7/2006 | Ji | |
| 2006/0274713 A1* | 12/2006 | Pandey et al. ................ | 370/346 |
| 2008/0170544 A1 | 7/2008 | Tang et al. | |
| 2008/0253327 A1 | 10/2008 | Kohvakka et al. | |
| 2009/0063615 A1* | 3/2009 | Gobara et al. ................ | 709/203 |
| 2009/0232234 A1* | 9/2009 | Du ....................... | H04B 7/2621 375/260 |
| 2010/0195636 A1* | 8/2010 | Nakashima et al. .......... | 370/342 |
| 2011/0051630 A1* | 3/2011 | Pennance ....................... | 370/279 |
| 2013/0329689 A1* | 12/2013 | Choi ..................... | H04L 1/1829 370/329 |

FOREIGN PATENT DOCUMENTS

| | | |
|---|---|---|
| WO | WO-2006/023771 A2 | 3/2006 |
| WO | 2008/084949 A1 | 7/2008 |
| WO | 2009/112080 A1 | 9/2009 |
| WO | 2011/086426 A1 | 7/2011 |

OTHER PUBLICATIONS

International Search Report and Written Opinion received for corresponding Patent Cooperation Treaty Application No. PCT/IB2010/051597, dated Dec. 13, 2010, 15 pages.

Karn, "MACA—A New Channel Access Method for Packet Radio", 9th ARRL Computer Networking Conference, Sep. 1990, pp. 134-140.

Research in Motion UK Limited. "Performance Analysis of UE Association in a Type-II Relay Network", 3GPP Draft, R1-094462(Rim-Type 2 Relay UE Association), 3rd Generation Partnership Project (3GPP), Mobile Competence Centre; 650, Route Des Lucioles; F-06921 Sophia-Antipolis Cedex; France, No. Jeju; 20091109, Nov. 9, 2009 (Nov. 9, 2009), XP050388887.

* cited by examiner though the connection between the gateway and the access point in such situations is provided by cellular network resources, the connection between the gateway and the endpoint device may be some other short range communication radio (e.g., short range radios employing Bluetooth, wireless local area networks (WLAN) and/or the like). Thus, two radios may be required for some M2M applications. In some other applications, where direct cellular communication is provided between the access point and the endpoint devices, such devices are typically not small battery operated devices, but instead are larger more powerful machines.

METHOD AND APPARATUS FOR PROVIDING MACHINE INITIAL ACCESS PROCEDURE FOR MACHINE TO MACHINE COMMUNICATION

RELATED APPLICATION

This application was originally filed as PCT Application No. PCT/IB2010/051597 filed Apr. 13, 2010.

TECHNOLOGICAL FIELD

Embodiments of the present invention relate generally to inter-device communications technology and, more particularly, relate to an apparatus and method for providing an initial access procedure in machine-to-machine communication in a wireless network.

BACKGROUND

The modern communications era has brought about a tremendous expansion of wireline and wireless networks. Computer networks, television networks, and telephone networks are experiencing an unprecedented technological expansion, fueled by consumer demand. Wireless and mobile networking technologies have addressed related consumer demands, while providing more flexibility and immediacy of information transfer.

Machine-to-machine (M2M) communication has recently become an area of interest for its growth potential. M2M communication is also exciting to many users and developers for its potential for connecting devices for many different purposes such as smart homes, smart metering, fleet management, remote healthcare, access network operation management and numerous other uses.

M2M communication typically involves the connection of a device or group of devices to a remote server or computer system to enable remote measurement or remote reporting of information. In some cases, M2M communication involves the use of one or more sensors or other nodes or devices to gather information that can be passed to a network or computing device via some form of gateway device. Recently, mobile terminals such as cellular phones have been employed as the gateway device in order to enable remote devices or sensors to provide information to a central location or a network for processing. In some cases, the network may be the Internet or some more localized computing network.

The use of cellular communication systems in M2M applications has been advantageous due to the wide coverage areas that are currently provided by cellular communication systems. Typical endpoint devices in an M2M communication system are relatively small battery operated devices with relatively low transmission power capabilities. Thus, by interfacing with nearby mobile terminals that can connect to a cellular communication system, the endpoint devices may be able to operate at low power and still provide information to remote computing or storage devices via a mobile terminal acting as a gateway to, for example, a cellular network access point. While the connection between the gateway and the access point in such situations is provided by cellular network resources, the connection between the gateway and the endpoint device may be some other short range communication radio (e.g., short range radios employing Bluetooth, wireless local area networks (WLAN) and/or the like). Thus, two radios may be required for some M2M applications. In some other applications, where direct cellular communication is provided between the access point and the endpoint devices, such devices are typically not small battery operated devices, but instead are larger more powerful machines.

Connectivity between the machine and the network may, at times, be unreliable or slow and thus it may be desirable to have an improved method to increase the likelihood of successful communications when a connection is initiated.

BRIEF SUMMARY OF EXAMPLE EMBODIMENTS

A method and apparatus are therefore provided that may enable the provision of M2M communication in a wireless network environment. In this regard, for example, relatively low power devices (specifically referencing low transmission power) such as sensors or other machines in an M2M system may be enabled to initiate communication with a network through a mobile terminal in a more reliable and robust manner. The machine may transmit a busy-signal to request a reservation of a machine access slot on a machine access control channel to reserve the slot before transmitting any machine information or data to reduce the likelihood of collisions with other machines. Once the machine has reserved the machine access slot, the machine may transmit identification information via randomly selected frequency division multiplexed or code division multiplexed resources to further reduce the likelihood of collisions with other machines. Thus, delays in establishing connections may be reduced or eliminated.

In an example embodiment, an apparatus for providing machine-to-machine communication in a wireless network is provided. The apparatus may include at least one processor and at least one memory including computer program code. The at least one memory and the computer program code may be configured, with the processor, to cause the apparatus to at least determine if a busy-signal has been detected for a machine access slot of a machine access channel, provide for transmission of a busy-signal request for a reservation of the machine access slot in response to determining that no busy-signal had been detected for the machine access slot, provide for transmission of identification, and receive a machine access response message. The apparatus may further increase a congestion window for busy signal transmission in response to the machine access response message not being received within the predetermined period of time. The apparatus may further be caused to provide for transmission of a cyclic redundancy check. The identification may be transmitted over a reserved machine access slot by using randomly selected frequency division multiplexed channel resources or randomly selected code division multiplexed channel resources. The busy-signal may be time division multiplexed or frequency division multiplexed. The machine access response message may include a machine radio network temporary identifier (RNTI) and/or a machine gateway radio network temporary identifier, and/or the machine identification.

In another example embodiment, a method of providing machine-to-machine communication in a wireless network is provided. The method may include determining if a busy-signal has been detected for a machine access slot of a machine access channel, providing for transmission of a busy-signal request for reservation of the machine access slot in response to determining that no busy-signal had been detected for the machine access slot, providing for transmission of identification, and receiving a machine access response message. The method may further include increasing the congestion window for busy signal transmission in response to the machine access response message not being received within the period of time. The identification may be transmitted over the reserved machine access slot by using randomly selected frequency division multiplexed resources or randomly selected code division multiplexed resources. The busy-signal may be time division multiplexed or frequency division multiplexed. The machine access response message may include a machine radio network temporary identifier, and/or a machine gateway radio network temporary identifier, and/or the machine identification.

In another example embodiment, a computer program product for providing machine-to-machine communication in a wireless network is provided. The computer program product may include at least one computer-readable storage medium having computer executable program code instructions stored therein. The computer-executable program code instructions may include program code instructions for determining if a busy signal has been detected for a machine access slot of a machine access channel, program code instructions for providing for transmission of a busy-signal request for reservation of the machine access slot in response to determining that no busy-signal had been detected for the machine access slot; program code instructions for providing for transmission of identification; and program code instructions for receiving a machine access response message. The computer program product may further include program code instructions for increasing a congestion window for busy signal transmission in response to not receiving a machine access response message within the predetermined period of time. The computer program product may further include program code instructions for providing for transmission of a cyclic redundancy check. The identification may be transmitted over the reserved machine access slot by using randomly selected frequency division multiplexed channel resources or randomly selected code division multiplexed channel resources. The busy-signal may be time division multiplexed or frequency division multiplexed. The machine access response message may include a machine radio network temporary identifier, and/or a machine gateway radio network temporary identifier, and/or the machine identification.

In still another example embodiment, an apparatus for providing machine-to-machine communication in a wireless network is provided. The apparatus may include at least one processor and at least one memory including computer program code. The at least one memory and the computer program code may be configured, with the processor, to cause the apparatus to at least receive a machine identification over a reserved machine access slot in a machine access channel, blindly decode the machine access channel to obtain the machine identification, provide for transmission of the machine identification, and receive a machine access response. Providing for transmission of the machine identification may include using a physical uplink control channel or a physical uplink shared channel. The machine access response message may include a radio network temporary identifier. The decoding may include demultiplexing a frequency division multiplexed signal or a code division multiplexed signal.

In another example embodiment, a method of providing machine-to-machine communication in a wireless network is provided. The method may include receiving a machine identification over a reserved machine access slot in a machine access channel, blindly decoding the machine access channel to obtain the machine identification, providing for transmission of the machine identification, and receiving a machine access response message. Providing for transmission of the machine identification may include using a physical uplink control channel or a physical uplink shared channel. The machine access response message may include a radio network temporary identifier. The decoding may include demultiplexing a frequency division multiplexed signal or a code division multiplexed signal.

In yet another example embodiment, a computer program product for providing machine-to-machine communication in a wireless network is provided. The computer program product may include at least one computer-readable storage medium having computer executable program code instructions stored therein. The computer-executable program code instructions may include program code instructions for receiving a machine identification over a reserved machine access slot in a machine access channel, program code instructions for blindly decoding the machine access channel to obtain the machine identification, program code instructions for providing for transmission of the machine identification, and program code instructions for receiving a machine access response message. The program code instructions for providing for transmission of the machine identification include program code instructions for using a physical uplink control channel or a physical uplink shared channel. The machine access response message may include a radio network temporary identifier. The program code instructions for blindly decoding the machine access channel includes program code instructions for demultiplexing a frequency division multiplexed signal or a code division multiplexed signal.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

DETAILED DESCRIPTION

Figure 1:
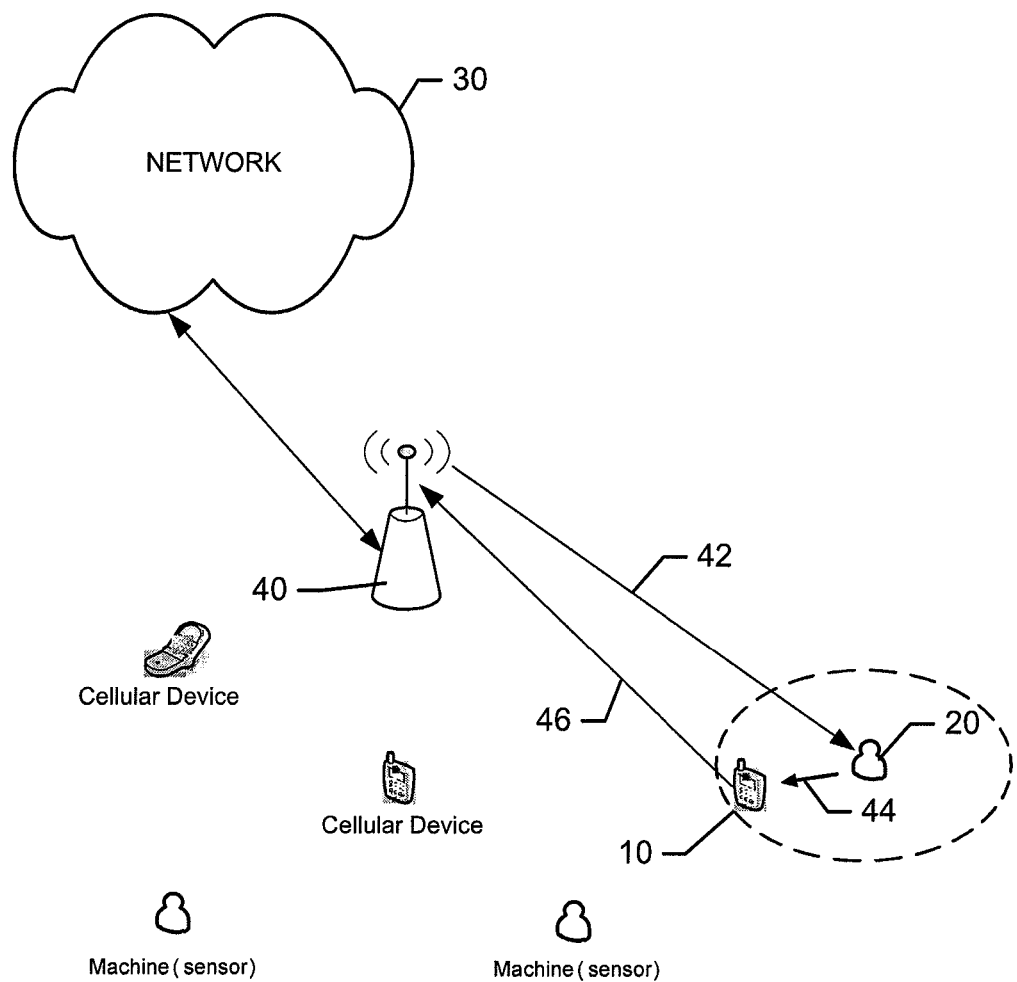
FIG. 1 illustrates one example of a communication system according to an example embodiment of the present invention.

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein a "computer-readable storage medium," which refers to a physical storage medium (e.g., volatile or non-volatile memory device), can be differentiated from a "computer-readable transmission medium," which refers to an electromagnetic signal.

As indicated above, mobile terminals acting as gateway devices in an M2M communication system are often required to employ two different radios, particularly when employed with M2M communication systems involving relatively low power (e.g., low transmission power) sensors or sensor networks. Some embodiments of the present invention may provide a mechanism by which sensors or sensor networks may be allocated specific wireless network resources by the access point so that two radios are not required. In some cases, in a wireless network employing cellular network resources, the cellular network access point may allocate specific cellular network resources for communication conducted between the endpoint machine or machines (e.g., the sensors) and the access point and gateway device. For example, the access point may allocate cellular downlink channel resources for downlink direction communications from the access point to the machine(s) and between the gateway device (or relay) and the machine(s). Communications to be provided from the machine(s) to the access point may then be routed through the gateway device and the gateway device can relay those communications via cellular network uplink resources.

FIG. 1 illustrates a generic system diagram in which a device such as a mobile terminal 10, is shown in an example communication environment in which embodiments of the present invention may be employed. As shown in FIG. 1, an embodiment of a system in accordance with an example embodiment of the present invention may include a first communication device (e.g., mobile terminal 10) that may act as a relay or gateway device and one or more machines (e.g., sensor 20) capable of communication with the gateway device and perhaps also each other. In an example embodiment, the mobile terminal 10 and the sensor 20 may be in (or be capable of being placed in) communication with each other and with a network 30 via an access point 40. In some cases, embodiments of the present invention may further include one or more network devices with which the mobile terminal 10 and/or the sensor 20 may communicate to provide, request and/or receive information.

The network 30 may include a collection of various different nodes, devices or functions that may be in communication with each other via corresponding wired and/or wireless interfaces. As such, the illustration of FIG. 1 should be understood to be an example of a broad view of certain elements of the system and not an all inclusive or detailed view of the system or the network 30. One or more communication terminals such as the mobile terminal 10 and the sensor 20 may be in communication with each other via the network 30 or via device to device (D2D) communication and each may include an antenna or antennas for transmitting signals to and for receiving signals from a base site (e.g., access point 40), which could be, for example a base station that is a part of one or more cellular or mobile networks or an access point that may be coupled to a data network, such as a local area network (LAN), a metropolitan area network (MAN), and/or a wide area network (WAN), such as the Internet. In turn, other devices such as processing elements (e.g., personal computers, server computers or the like) may be coupled to the mobile terminal 10 and/or the sensor 20 via the network 30 and the access point 40. In some embodiments, the network 30 may employ one or more mobile access mechanisms such as wideband code division multiple access (W-CDMA), CDMA2000, global system for mobile communications (GSM), general packet radio service (GPRS), long term evolution (LTE), LTE Advanced and/or the like may be supported.

In some example embodiments, the mobile terminal 10 may be a mobile communication device such as, for example, a personal digital assistant (PDA), wireless telephone, mobile computing device, camera, video recorder, audio/video player, positioning device (e.g., a global positioning system (GPS) device), game device, television device, radio device, or various other like devices or combinations thereof. As such, the mobile terminal 10 may include a processor and memory for storing instructions, which when executed by the processor, cause the mobile terminal 10 to operate in a particular way or execute specific functionality. The mobile terminal 10 may also include communication circuitry and corresponding hardware/software to enable communication with other devices.

The sensor 20 may be a mobile device such as a mobile sensor or other small battery operated device configured to detect local parameters or environmental conditions for reporting to a remote location. As such, each sensor may include some form of detection device or circuitry to measure a physical parameter or other measurable value along with some communication circuitry for enabling the sensor to communicate information to the mobile terminal 10. Sensors may also include memory and processing circuitry in some instances, and the processing circuitry may direct operation of the corresponding sensors. In some cases, the sensor 20 may be replaced by some other type of machine that may be a mobile or fixed communication device. Other machines and communication devices are also shown in FIG. 1 to illustrate that one access point may serve a plurality of communication devices either employing normal cellular network communications or in a capacity as a gateway device.

As shown in FIG. 1, one or more of the machines (e.g., sensor 20) may be positioned within the coverage area of the access point 40 along with one or more other communication devices (e.g., mobile terminal 10). In general, the machines or sensors may be relatively low power communication devices (in reference to transmission power) and thus, although some machines or sensors may be within range to receive data from the access point 40, the machines or sensors may not have sufficient power to transmit to the access point. Thus, while the access point 40 may be configured to communicate directly with the sensor 20 in the downlink direction utilizing downlink channel resources as indicated by wireless link 42, the wireless link 42 may not support uplink communication. Instead, the sensor 20 may utilize communication with a gateway device (e.g., the mobile terminal 10) that is within its relatively limited communication range to provide uplink information to the access point 40. Thus, the sensor 20 may be configured to communicate with the mobile terminal 10 to provide data, information or message traffic to the mobile terminal 10 for relaying to the access point 40 via wireless link 44. The communication from the sensor 20 to the mobile terminal 10 may be provided via downlink channel resources as well. The access point 40 may designate resource blocks to be used for sensor 20 to mobile terminal 10 communication in this manner. The information provided to the mobile terminal 10 for relaying to the access point 40 may be communicated from the mobile terminal 10 to the access point 40 via uplink channel resources via wireless link 46.

Accordingly, the access point 40 (which may be a base station, e-Node B (eNB), Node B, or other type of access point) may be configured to operate both uplink and downlink channels. The access point 40 of an example embodiment is enabled to communicate with both the sensor 20 and the mobile terminal 10 in the downlink direction. However, the access point 40 of an example embodiment is enabled to communicate only with the mobile terminal 10 (or communication devices other than the sensor 20 and other machines or sensors) in the uplink direction. Moreover, as indicated above, the access point 40 of an example embodiment is configured to allocate network resources to accommodate the communications described above.

The mobile terminal 10 acting as a gateway or relay device according to an example embodiment is configured to operate using both uplink and downlink channel resources. However, with respect to communications as a relay or gateway device, the mobile terminal 10 of this example is configured to receive data from both the sensor 20 (or other machines or sensors) and the access point 40, but is only configured to send data to the access point 40.

Figure 2:
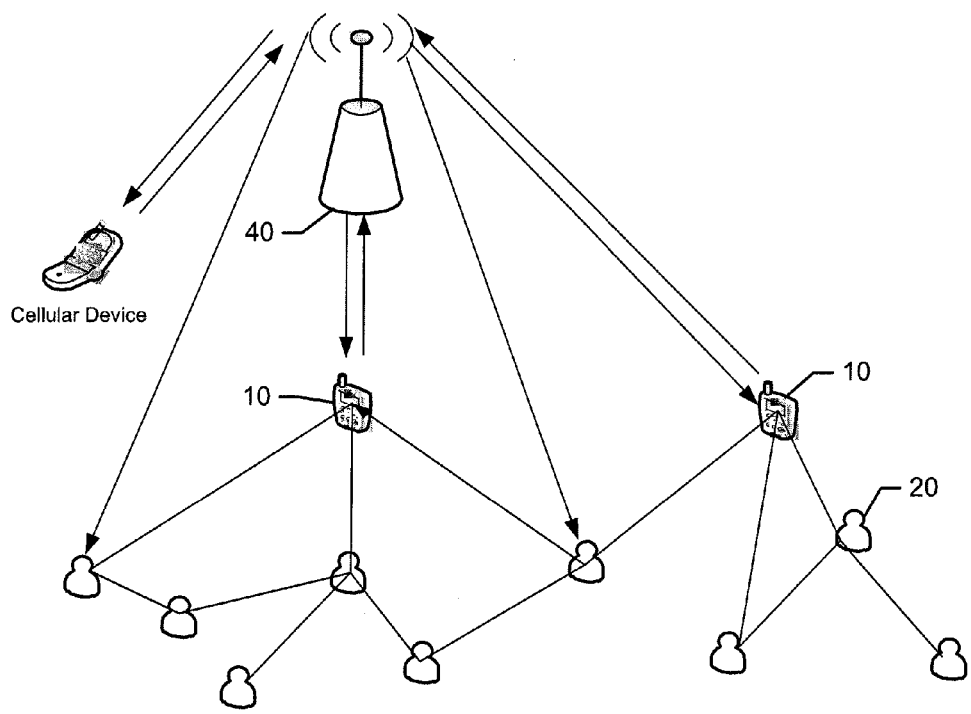
FIG. 2 illustrates an example communication system with multiple networked machines or sensors according to an example embodiment of the present invention.
Figure 3:
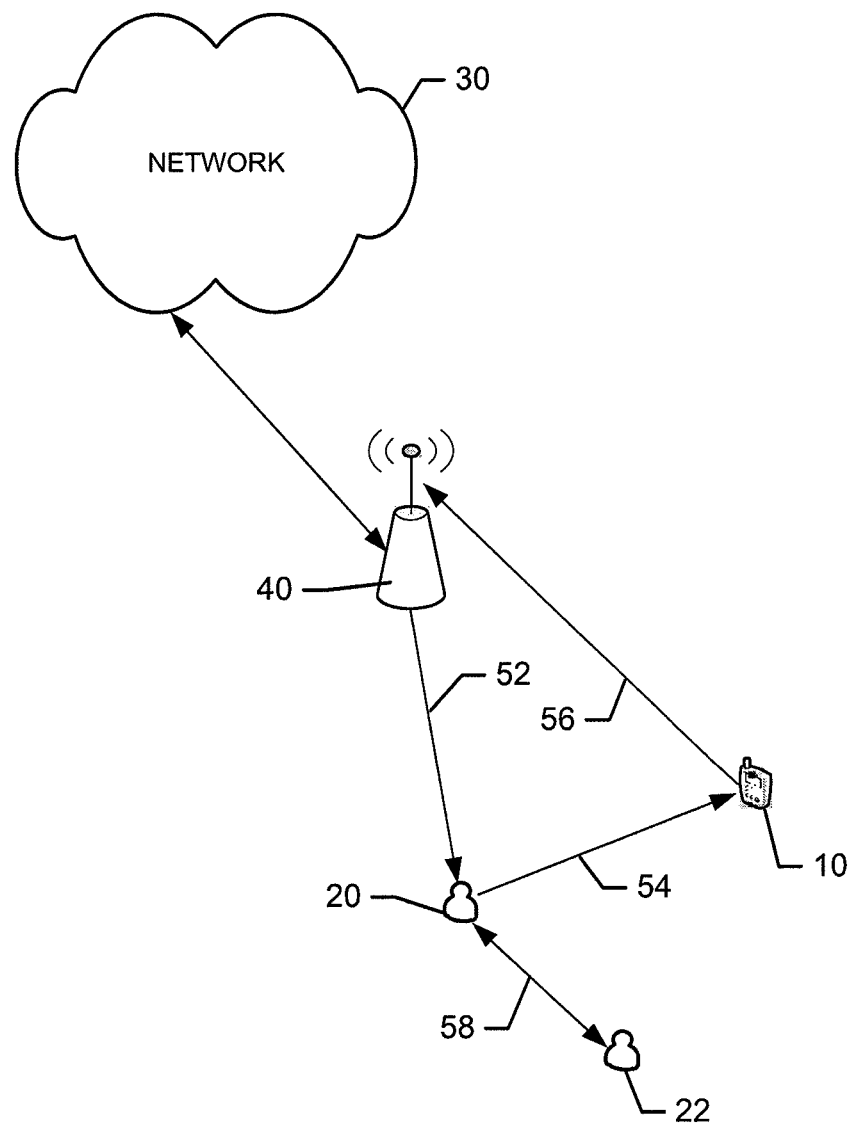
FIG. 3 illustrates another example communication system showing communication links between various entities in connection with a system for providing machine-to-machine communication in a wireless network in accordance with an example embodiment of the present invention.

Machines or sensors such as the sensor 20 that are operating in accordance with this example embodiment may be configured to operate using downlink channel resources designated by the access point. The machines or sensors may therefore send data to the mobile terminal 10 and receive signaling from the access point 40. In some embodiments, the machines or sensors may also receive signaling from other machines or sensors. FIG. 2 illustrates an example of a sensor network in which various sensors or machines (including sensor 20) are enabled to communicate with each other and, in the case of some sensors also with M2M gateway devices such as mobile terminals 10 and with the access point 40. FIG. 3 further illustrates the communication that may be provided between sensors according to an example embodiment.

As shown in FIG. 3 and described above, the access point 40 may be configured to communicate directly with the sensor 20 in the downlink direction utilizing downlink channel resources as indicated by wireless link 52. In this example, the downlink channel resources may include cellular frequency domain duplexing (FDD) downlink resources. The sensor 20 may be configured to communicate with the mobile terminal 10 to provide data, information or message traffic to the mobile terminal 10 for relaying to the access point 40 via wireless link 54. The communication from the sensor 20 to the mobile terminal 10 may be provided via downlink channel resources including cellular FDD downlink channel frequencies as well. The information provided to the mobile terminal 10 for relaying to the access point 40 may be communicated from the mobile terminal 10 to the access point 40 via uplink channel resources via wireless link 56. As such, the mobile terminal 10 may be enabled to utilize both FDD uplink and downlink resources to communicate with the access point 40. In this example embodiment, the sensor 20 may be enabled to also communicate with a node 22. The node 22 may be another sensor or machine with which the sensor 20 is capable of communicating using cellular FDD downlink frequencies operating with time domain duplexing (TDD) principles as shown by wireless link 58.

Figure 4:
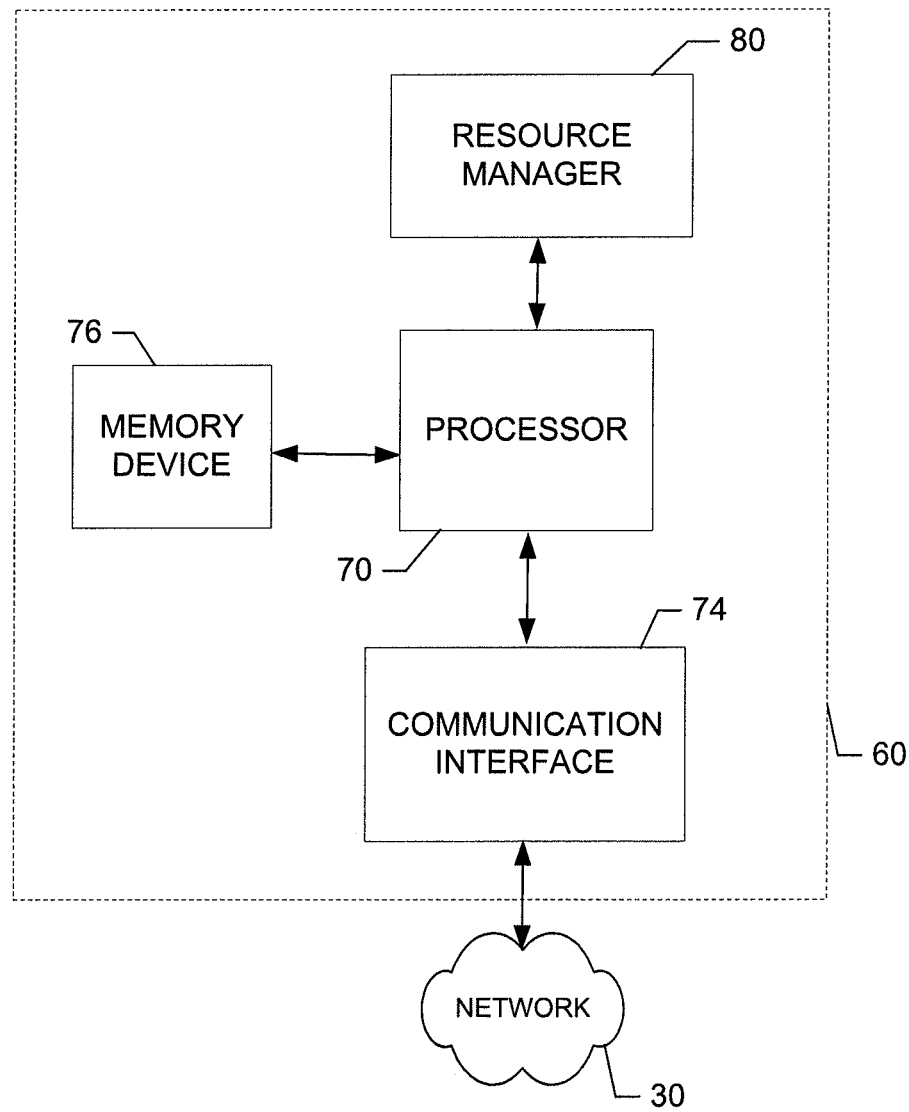
FIG. 4 illustrates a block diagram showing an apparatus for providing machine-to-machine communication in a wireless network in accordance with an example embodiment of the present invention.

In an example embodiment, the access point 40 may be configured to include or otherwise employ an apparatus according to an example embodiment of the present invention. FIG. 4 illustrates a schematic block diagram of an apparatus for providing M2M communication in a wireless network according to an example embodiment of the present invention. An example embodiment of the invention will now be described with reference to FIG. 4, in which certain elements of an apparatus 60 for providing M2M communication in a wireless network are displayed. The apparatus 60 of FIG. 4 may be employed, for example, on an access point or a variety of other devices. However, it should be noted that the components, devices or elements described below may not be mandatory and thus some may be omitted in certain embodiments. Additionally, some embodiments may include further components, devices or elements beyond those shown and described herein.

Referring now to FIG. 4, the apparatus 60 may include or otherwise be in communication with a processor 70, a communication interface 74 and a memory device 76. The memory device 76 may include, for example, one or more volatile and/or non-volatile memories. In other words, for example, the memory device 76 may be an electronic storage device (e.g., a computer readable storage medium)

comprising gates configured to store data (e.g., bits) that may be retrievable by a machine (e.g., a computing device). The memory device 76 may be configured to store information, data, applications, instructions or the like for enabling the apparatus to carry out various functions in accordance with example embodiments of the present invention. For example, the memory device 76 could be configured to buffer input data for processing by the processor 70. Additionally or alternatively, the memory device 76 could be configured to store instructions for execution by the processor 70.

The processor 70 may be embodied in a number of different ways. For example, the processor 70 may be embodied as one or more of various processing means such as a coprocessor, a microprocessor, a controller, a digital signal processor (DSP), a processing element with or without an accompanying DSP, or various other processing devices including integrated circuits such as, for example, an ASIC (application specific integrated circuit), an FPGA (field programmable gate array), a microcontroller unit (MCU), a hardware accelerator, a special-purpose computer chip, or the like. In an example embodiment, the processor 70 may be configured to execute instructions stored in the memory device 76 or otherwise accessible to the processor 70. Alternatively or additionally, the processor 70 may be configured to execute hard coded functionality. As such, whether configured by hardware or software methods, or by a combination thereof, the processor 70 may represent an entity (e.g., physically embodied in circuitry) capable of performing operations according to embodiments of the present invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and/or operations described herein when the instructions are executed. However, in some cases, the processor 70 may be a processor of a specific device (e.g., an eNB, AP or other network device) adapted for employing embodiments of the present invention by further configuration of the processor 70 by instructions for performing the algorithms and/or operations described herein. The processor 70 may include, among other things, a clock, an arithmetic logic unit (ALU) and logic gates configured to support operation of the processor 70.

Meanwhile, the communication interface 74 may be any means such as a device or circuitry embodied in either hardware, software, or a combination of hardware and software that is configured to receive and/or transmit data from/to a network 30 and/or any other device or module in communication with the apparatus. In this regard, the communication interface 74 may include, for example, an antenna (or multiple antennas) and supporting hardware and/or software for enabling communications with a wireless communication network. In some environments, the communication interface 74 may alternatively or also support wired communication. As such, for example, the communication interface 74 may include a communication modem and/or other hardware/software for supporting communication via cable, digital subscriber line (DSL), universal serial bus (USB) or other mechanisms.

In an example embodiment, the processor 70 may be embodied as, include or otherwise control a resource manager 80. The resource manager 80 may be any means such as a device or circuitry operating in accordance with software or otherwise embodied in hardware or a combination of hardware and software (e.g., processor 70 operating under software control, the processor 70 embodied as an ASIC or FPGA specifically configured to perform the operations described herein, or a combination thereof) thereby configuring the device or circuitry to perform the corresponding functions of the resource manager 80 as described herein. Thus, in examples in which software is employed, a device or circuitry (e.g., the processor 70 in one example) executing the software forms the structure associated with such means.

In an example embodiment, the resource manager 80 is configured to control the allocation of wireless communication resources to enable the communications described above in accordance with an example embodiment of the present invention. As such, for example, the resource manager 80 is configured to allocate resources for use by machines or sensors such as the sensor 20 to communicate directly with the access point (e.g., in the downlink direction), and/or to communicate with other machines or sensors (bi-directionally), and/or to communicate with a gateway or relay (e.g., the mobile terminal 10 for uplink to the access point 40 via the mobile terminal 10). In an example embodiment, as described above, the resource manager 80 may be configured to allocate wireless network downlink resources (e.g., cellular downlink channel resources) for use by the sensor 20 to provide signaling to other machines or sensors or to the gateway. The resource manager 80 may also be configured to allocate wireless network uplink resources (e.g., cellular uplink channel resources) to receive data from the sensor 20 via the gateway (e.g., the mobile terminal 10). Uplink and downlink resources may also be managed with respect to communications with the mobile terminal 10 for communications that are not related to data being reported by the sensor 20 or other machines or sensors.

In some cases, the resource manager 80 is enabled to configure subframes of the LTE (or other communication interface) downlink signaling structure. Furthermore, the resource manager 80 may provide information to the mobile terminal 10 and the sensor 20 (or other machines) indicating the configuration to the signaling structure so that the mobile terminal 10 and the sensor 20 may utilize the corresponding signaling structure accordingly. In an example embodiment, the resource manager 80 also provides information to the mobile terminal 10 acting as a gateway to identify the downlink resource blocks that should be monitored by the mobile terminal 10 for possible signals from the sensor 20 (or other machines). Accordingly, during situations in which the mobile terminal 10 is in the vicinity of a machine such as the sensor 20 (e.g., within the machine's communication range), and the mobile terminal 10 receives data in the identified resource downlink resource blocks, the mobile terminal 10 may forward the corresponding data to the access point 40 or send a predetermined message to the access point 40. It should be appreciated that by employing the resource allocation techniques attributable to the resource manager 80 of example embodiments of the present invention, any arbitrary mobile terminal with M2M gateway capability may be employed as a "middleman" to relay M2M communications from machines or sensors to the access point 40. Thus, for example, a device in or accessible via the network 30 may collect information from the machines or sensors for network operation and/or planning purposes. In this regard, in some cases the information collected may be indicative of the number of devices close to a particular location within a cell, or the number of devices that are able to receive a particular transmission in a specific location within the cell.

One of the challenges for M2M communication is making the initial access or communication to the eNB with an efficient machine access procedure. Mobile terminals may use a Random Access Channel (RACH) method which may require a SIM card or similar identification module which machines in an M2M communication system may not have. In the RACH procedure of 3GPP, a random access (RA) preamble is sent by a mobile terminal. In return, the mobile terminal receives a temporary radio network temporary identifier (RNTI) and uplink resource assignments. The mobile terminal may then send a message over the resource assigned to the RA-RNTI corresponding to that RACH session and uses the assigned resources for the session. In M2M communications, there could be more machines than mobile terminals such that the machines connecting through mobile terminals and using the RACH communications of the mobile terminals drain the radio resources reserved for mobile terminal RACH access, thereby limiting the resources available to users of a mobile terminal. Accordingly, a network system may be required to reserve more RACH resources for machines and mobile terminals. Additional issues exist for machines in M2M communication as the machines often cannot communicate with an eNB bi-directionally. Thus, the "uplink" transmission in the downlink (DL) carrier my have to go through a mobile terminal that acts as a machine gateway to the eNB. The machine operating only in the DL carrier cannot measure the transmission in uplink (UL) from the mobile terminal. Consequently, the location of the machine gateway (e.g., the mobile terminal) cannot be predicted by the machine itself. In an environment where many machines are accessing different machine gateways simultaneously, the eNB may not be able to differentiate machines in the situation where simultaneous machine access is requested through different machine gateways.

Figure 5:
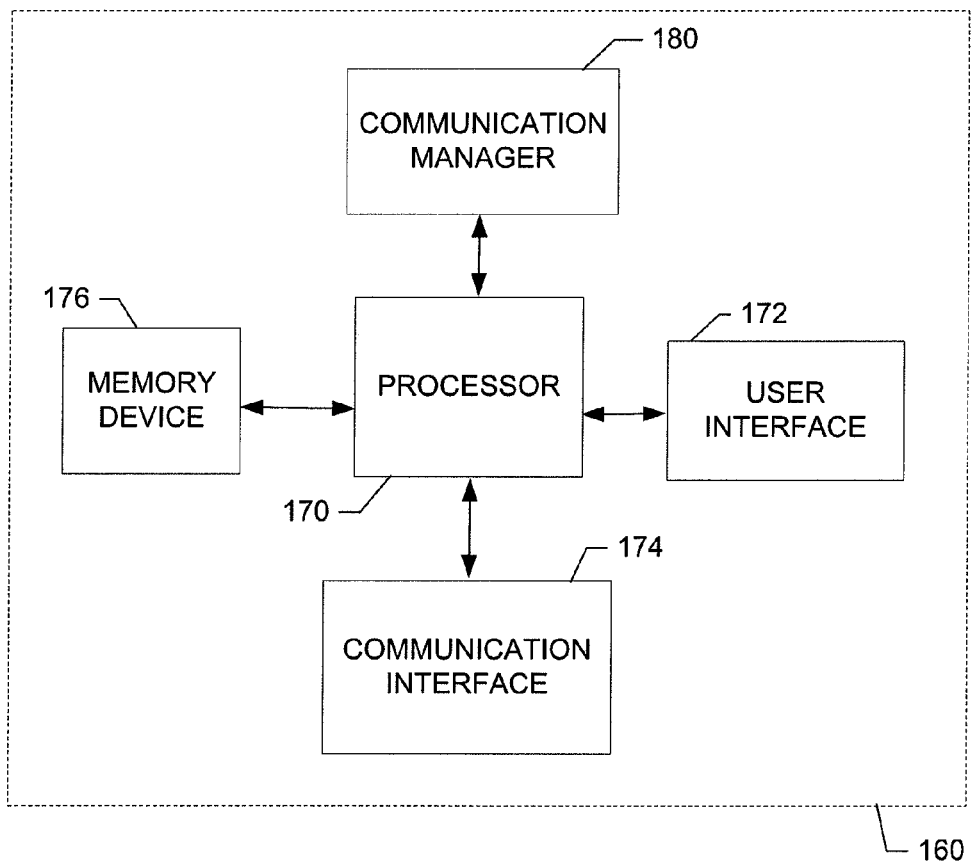
FIG. 5 illustrates a block diagram showing an apparatus for utilizing machine-to-machine communication at a gateway device in a wireless network in accordance with an example embodiment of the present invention.

FIG. 5 is a block diagram of an apparatus 160 that may be employed in connection with a gateway device (e.g., mobile terminal 10) practicing an example embodiment of the present invention. The apparatus 160 may include or otherwise be in communication with a processor 170, a user interface 172, a communication interface 174 and a memory device 176. The processor 170, the communication interface 174, and the memory device 176 may each be similar in general function and form to the processor 70, the communication interface 74 and the memory device 76 described above, so a detailed explanation of these components will not be provided. The user interface 172 may be in communication with the processor 170 to receive an indication of a user input at the user interface 172 and/or to provide an audible, visual, mechanical or other output to the user. As such, the user interface 172 may include, for example, a keyboard, a mouse, a joystick, a display, a touch screen, soft keys, a microphone, a speaker, or other input/output mechanisms. In this regard, for example, the processor 170 may comprise user interface circuitry configured to control at least some functions of one or more elements of the user interface, such as, for example, a speaker, ringer, microphone, display, and/or the like. The processor 170 and/or user interface circuitry comprising the processor 170 may be configured to control one or more functions of one or more elements of the user interface through computer program instructions (e.g., software and/or firmware) stored on a memory accessible to the processor 170 (e.g., memory device 176, and/or the like).

In an example embodiment, the processor 170 may be embodied as, include or otherwise control a communication manager 180. The communication manager 180 may be any means such as a device or circuitry operating in accordance with software or otherwise embodied in hardware or a combination of hardware and software (e.g., processor 170 operating under software control, the processor 170 embodied as an ASIC or FPGA specifically configured to perform the operations described herein, or a combination thereof) thereby configuring the device or circuitry to perform the corresponding functions of the communication manager 180 as described herein. Thus, in examples in which software is employed, a device or circuitry (e.g., the processor 170 in one example) executing the software forms the structure associated with such means. The communication manager 180 may be configured to utilize the resources allocated by the resource manager 80 above to communicate with the access point 40 and the sensor 20.

Figure 6:
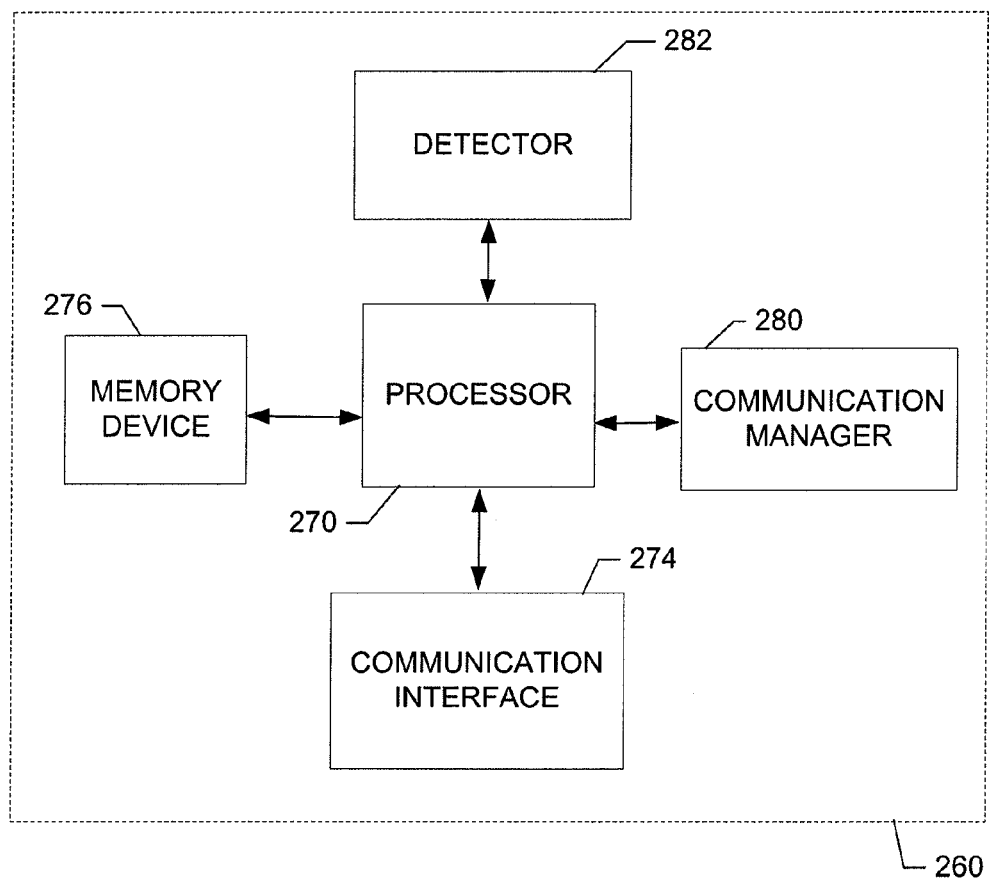
FIG. 6 illustrates a block diagram showing an apparatus for utilizing machine-to-machine communication at a machine or sensor in a wireless network in accordance with an example embodiment of the present invention.

FIG. 6 is a block diagram of an apparatus 260 that may be employed in connection with a machine or sensor (e.g., sensor 20) practicing an example embodiment of the present invention. The apparatus 260 may include or otherwise be in communication with a processor 270, a communication interface 274 and a memory device 276. The processor 270, the communication interface 274, and the memory device 276 may each be similar in general function and form to the processor 70, the communication interface 74 and the memory device 76 described above, so a detailed explanation of these components will not be provided.

In an example embodiment, the processor 270 may be embodied as, include or otherwise control a communication manager 280 and a detector 282. The communication manager 280 and the detector 282 may each be any means such as a device or circuitry operating in accordance with software or otherwise embodied in hardware or a combination of hardware and software (e.g., processor 270 operating under software control, the processor 270 embodied as an ASIC or FPGA specifically configured to perform the operations described herein, or a combination thereof) thereby configuring the device or circuitry to perform the corresponding functions of the communication manager 280 and the detector 282, respectively, as described herein. Thus, in examples in which software is employed, a device or circuitry (e.g., the processor 270 in one example) executing the software forms the structure associated with such means. The communication manager 280 may be configured to utilize the resources allocated by the resource manager 80 above to communicate with the access point 40 and the mobile terminal 10. The detector 282 may be configured to detect some parameter or information for reporting to a remote device via the mobile terminal 10 and the access point 40.

In an example embodiment, the communication manager 280 may be configured to perform at least receiving direct downlink communication from the access point 40 to the sensor 20, receiving (e.g., via the direct downlink communication) an indication of wireless network resources usable for provision of uplink data indirectly to the access point 40 via a mobile gateway device (e.g., the mobile terminal 10), and providing the uplink data to the mobile gateway device using the wireless network resources indicated.

A machine, such as the device 260 depicted in FIG. 6, may communicate with other machines and with a machine gateway using a first protocol, such as near-field communications, while the machine gateway may communicate with the eNB using a second protocol, such as far-field communications. Optionally, a machine gateway may operate in the TDD mode sharing the air interface in the time domain between the machine links and the cellular links. This method is similar to a TDD relay node sharing one air interface between the access link and backhaul link. Both of the aforementioned methods may require a kind of symmetric communication for each link (e.g., out-coming traffic and the corresponding feedback from the counterpart would be operated in the same air interface). However, in the embodiment illustrated in FIG. 3 with asymmetric connections, it is impossible for the machine gateway (a typical FDD mobile terminal) to send a feedback message in response to the received packets or request from the machines as the machine, with only DL carrier transceivers, cannot hear any UL transmission from the mobile terminal. Thus, the initial access from the machine to the eNB through the mobile terminal acting as a machine gateway may be very difficult, unreliable, and inefficient.

Figure 7:
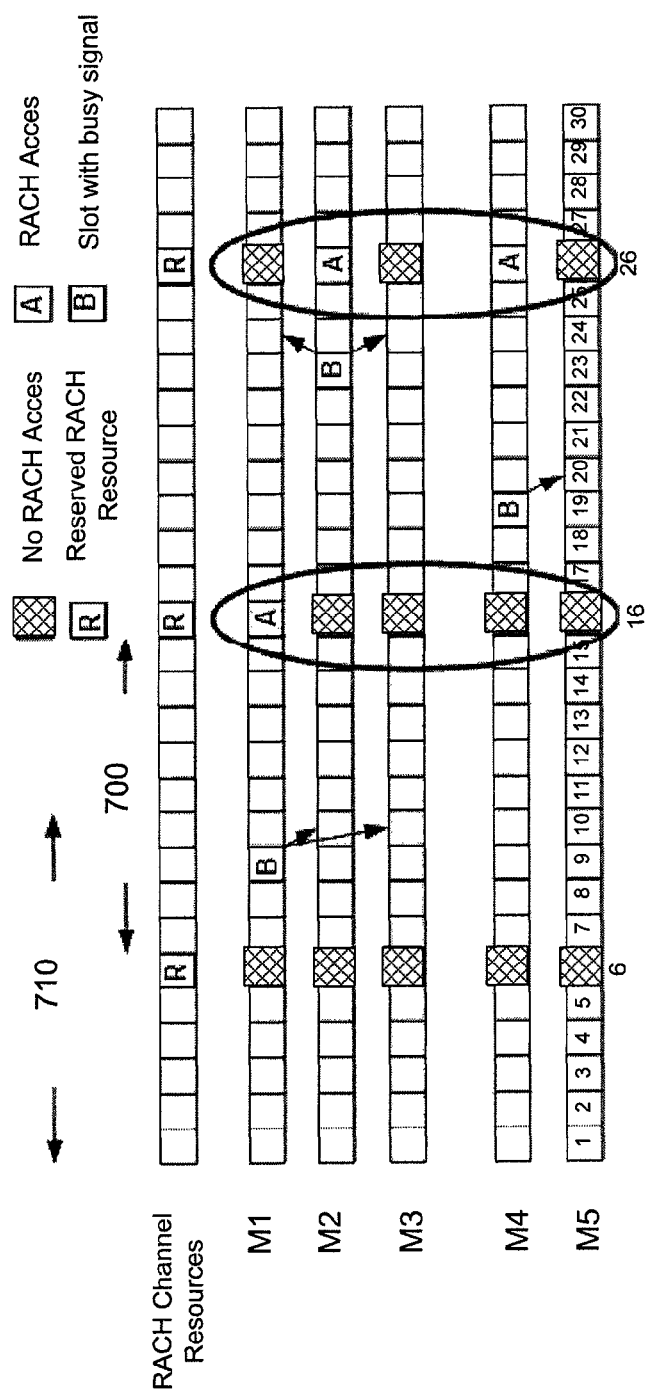
FIG. 7 illustrates a diagram representing a machine access channel signal according to an example embodiment of the present invention.

Embodiments of the present invention are configured to reduce the probability of machine traffic collision and increase the efficiency with which a mobile terminal operates as a machine gateway (e.g. 160). A machine, such as the apparatus depicted in the block diagram of FIG. 6, may implement a hybrid machine access procedure which may include the transmission of a busy-signal by a machine to reserve the machine access channel in the time domain and subsequently sending machine information via a RACH procedure over the reserved machine access channel. The busy-signal is used to reserve the orthogonal machine access channel in a pre-contention method for the purpose of reducing the likelihood of machine collision during machine access procedures. An example embodiment is illustrated in FIG. 7, in which the Reserved RACH Resource slots are represented by R, the RACH access slots are identified by A, the slots with Busy-signals are represented by B, and the slots with no RACH access are shaded. The M2M RACH interval is illustrated by arrow 700 and one frame is shown by arrow 710 as including 10-slots. RACH access slots can consist of FDM/CDM (frequency-division multiplexed/code-division multiplexing) resources.

The apparatus depicted in FIG. 6 includes an apparatus 260, which may be employed in connection with a machine or sensor (e.g. sensor 20) for implementing embodiments of the present invention. The machine may detect environmental conditions or other measurements or events through a detector 282. During each machine access interval, each machine may randomly select a time/frequency resource in a physical resource block (PRB) reserved by the eNB for sending the busy-signal, using, for example processor 270, in one of two possible ways: (i) An FDM with a busy-signal consisting of K resource elements (REs) mapped to subcarrier index $i^{th}$ of orthogonal frequency-division multiplexing (OFDM) symbols in the non-control region of the PRB and excluding REs used for Cell-specific Reference Signals; or (ii) a time division multiplexed signal (TDM) with busy-signal consisting of K REs mapped to the subcarriers in OFDM symbol index $n^{th}$ in the non-control region of the PRB and excluding REs used for Cell-specific Reference Signals. To help with the detection of the busy-signal in a noisy environment at the machine gateway (e.g., mobile terminal 10), a unique orthogonal sequence with good auto-correlation properties could be mapped to K REs of the busy-signal. At the pre-determined moment, the machine may then send a busy-signal unless the machine has previously detected any busy-signal beforehand for the current machine access interval. The machine 260 may detect, through, for example the communications interface 274, that a busy-signal has previously been sent to reserve a RACH access slot by another machine and wait until the next RACH interval before sending a busy-signal. The busy-signal may be transmitted by the machine using a communications interface, such as 274, which may implement a wide area communication protocol, such as LTE or a near-field communication protocol, such as Bluetooth® or Zigbee® among others. Thus, the machine can reduce the contended machine access channels used by the machines by the pre-contention of a simple busy-signal transmission among local machines. If a machine has previously detected a busy-signal in the current machine access interval, the machine may wait until the next interval to transmit its own busy-signal. Busy-signal transmission as a pre-contention step may only partially resolve access collision issues from neighbors experienced in M2M networks as will be further detailed below.

After transmitting a busy-signal and not detecting any busy-signals attempting to reserve the same RACH access slot, the machine may transmit an initial access message at the RACH slot reserved by the busy-signal by using randomly selected FDM/CDM channel resources via the communications interface 274. The initial access message from the machine may include machine ID (stored, for example, in the memory device 276) and a cyclic redundancy check (CRC) over the machine access channel to access the machine gateway. As this initial access channel is transmitted by a randomly selected FDM/CDM channel resource, the likelihood of further collisions is reduced. As the machine typically uses low power for the transmission, it may only access the neighbor mobile terminals with no need for further synchronization.

The machine gateway, such as the apparatus 160 depicted in FIG. 5, upon receiving the machine ID and CRC over the machine access channel though, for example the communications interface 174, may blindly decode machine access channels with limited options to obtain the accessing machine IDs at the configured machine access period. The decoding operation may be performed, for example, in the processor 170 of the apparatus 160. The machine gateway may then forward the received machine access information (e.g., machine ID), via the communications interface 174 to the eNB by using uplink channels (the physical uplink control channel (PUCCH) or the physical uplink shared channel (PUSCH), depending on the length of the machine ID) at the scheduled time or eNB defined machine access message forwarding time. The communications manager 180 may manage the scheduled communications that are sent via the communications interface 174. Additionally, the mobile terminal may verify its own capability of acting as a machine gateway and authenticate machines with pre-configured information. Authentication may be performed by the processor 170 and may reference the memory device 176 for data related to the mobile terminal's capability of acting as the machine gateway.

Upon receipt of the machine ID and CRC from the machine gateway, the eNB may form a machine/machine gateway (mobile terminal) pair. The eNB may then allocate a common machine radio network temporary identifier (RNTI) via machine access response message. A machine-RA-RNTI from the eNB could be used in the physical downlink control channel (PDCCH) to indicate the corresponding physical downlink shared channel (PDSCH) for machine access response messages. The eNB may configure time, frequency, and code resources allocated for machine access to the mobile terminal. The eNB may further configure the time and frequency resources allocated for the machine busy signal transmission. A common machine RNTI for the paired machine/machine gateway may be allocated by the eNB. The common machine RNTI may be transmitted via the machine access response message to the pair. A machine access response message may include machine RNTI+machine ID+mobile terminal RNTI. Machines and the mobile terminals may store, at least temporarily, the machine RNTI and/or mobile terminal RNTI in their respective memory devices 178, 278 and may recognize each other by decoding the machine access response message and also receive the allocated machine RNTI. Decoding of the machine access response message may be performed in the processors 170, 270 of the mobile terminal and the machine respectively.

The eNB may schedule machine data access by sending the resource allocation information with the machine RNTI via PDCCH. The machine may store this information in, for example the memory device 170, and then know when to send the message while the mobile terminal can know the time for message reception once it receives the machine scheduling information. Moreover, once the dedicated machine data access resources are allocated, machines may also use a request-to-send/clear-to-send (RTS/CTS) mechanism to access the known mobile terminals. The communications manager 280 of FIG. 6 may be configured to implement the appropriate mechanism for communication access to a known mobile terminal. Optionally, the eNB may adjust the machine transmission power by sending the power control commands with the RNTI, such that the machine processes the power control command via processor 270 and adjusts the transmission power for the communications interface 274 accordingly.

Using the pre-contention method of reserving a RACH access slot using a busy-signal, followed by transmission of an initial access message on the reserved RACH access slot using randomly selected FDM/CDM resources results in a very low likelihood of collision. However, it is possible that a collision may still occur, for example, if the busy-signal was not detected by a second machine (and the first machine did not detect the busy-signal from the second machine) and both machines randomly selected the same FDM/CDM resources, a collision may occur. Each of the machines is expecting to receive a machine access response message from the eNB in response to the initial access message. If the machine does not receive the machine access response message within a pre-defined period of time, failure of the machine access is assumed. The machine may then increase the period of time (for example, increment a congestion window (CW) size) for the subsequent busy-signal transmission and initial access message. For example, if an initial period of time was one machine access interval, upon failing to receive a machine access response message in response to the initial access message, the machine may increase the period of time to two machine access intervals. This would extend the time span in which a machine is sending the busy signal in order to reducing the collision. Once the machine successfully receives a machine access response message, the period of time may be reset to the original value. Optionally, the machine may increase the busy signal power to ensure that there are fewer machines competing for the same machine access channels. Increasing the busy-signal power allows more machines to detect the busy-signal and thereby causing them to not transmit initial access messages in the same RACH access slot.

The eNB may broadcast settings and configurations for the machine access channels. Time/frequency/code resources allocated for machine access may be transmitted to mobile terminals acting as machine gateways. Time/frequency resources allocated may be transmitted to the machine for machine busy signal transmission parameters. Further, the machine-RA-RNTI may also be broadcast by the eNB for the reception of the initial access response message.

Figure 8:
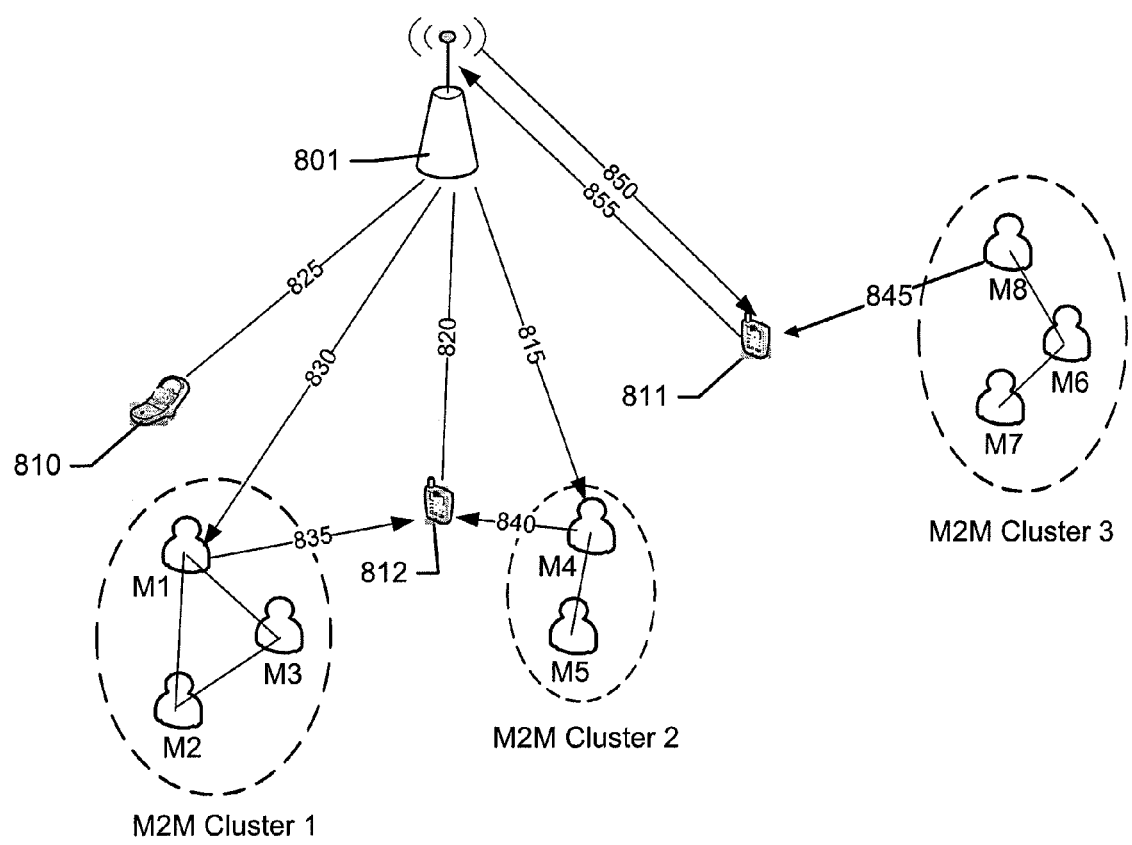
FIG. 8 illustrates an example communication system with communication links between various entities in connection with a system for providing machine-to-machine communication in a wireless network in accordance with an example embodiment of the present invention.

FIG. 8 illustrates an example embodiment of the present invention. Machines (M1-M8) can be virtually divided as three local clusters as depicted where there would be no interference between machines belonging to different clusters (e.g., the machines in one cluster are not in communication range of another cluster), but strong interference between machines within the same cluster. Mobile terminals 811, 812, and 813 may each act as a machine gateway. Conventional cellular links 815, 825 may exist between the eNB 801 and the mobile terminals 810, 812, shown more particularly with respect to mobile terminal 811 with a conventional cellular FDD downlink 850 and a conventional cellular FDD uplink 855. Each M2M cluster may communicate uplink resources to a mobile terminal acting as a machine gateway.

Pre-contention via the busy-signal transmission to reserve the RACH access slot of the machine access channel may occur in the time domain. As illustrated in FIG. 7 and with reference to the diagram of FIG. 8, with respect to cluster 1 and cluster 2, machines may select one busy-signal resource (one RE per slot for busy-signal) during a machine access interval preparing for busy-signal transmission. In the illustrated embodiment, there would be only 9 possible positions assuming only one RE in the frequency domain. If M1 did not previously hear any busy-signal, it would send the busy-signal at a randomly selected RE (e.g., RE in slot 9). Then the neighbor M2 and M3 (in the same cluster) would hear it and suspend their access to the next machine access interval. In the illustrated embodiment, M2 would send the busy-signal in the next machine access interval and obtain the machine access chance at slot 26. With the busy-signal pre-contention, the likelihood of machine competing for the same machine access channel can be reduced significantly. After successful pre-contention via the busy-signal transmission (e.g., no collision was experienced and no other busy-signal was detected by the machine), the machine may then transmit the machine ID and the CRC over a machine access channel to the gateway via randomly selected FDM/CDM resources to further reduce the likelihood of a collision.

Due to power limitations inherent in machines of M2M communication networks, the busy-signal from M2 may not be heard by all neighbor machines, such as M4 in cluster 2, which may access the same mobile terminal 812. Therefore, at the $26^{th}$ slot for the machine access channel, both machines may attempt to access the same cellular service and create a collision. Random selection of frequency/code (FDM/CDM) resources as indicated by broadcasting the channel can significantly reduce the collision between machines. If different FDM/CDM resources are selected by each machine, a collision may be avoided. In the event collision cannot be avoided, machines spaced sufficiently apart and connecting to different machine gateways may not experience machine access failure. If machines are close or connecting to the same machine gateway, failed machine access due to collision may be resolved by increasing the period of time for receiving a machine access response message as described above.

A mobile terminal may use blind decoding with the limited options such that the mobile terminal that is acting as the gateway would forward machine IDs to the eNB using the dynamic allocated resource via eNB scheduling, or the pre-reserved resource via eNB for (semi-) persistent scheduling. The eNB may authenticate machines and allocate two machine RNTIs separately for a first mobile terminal and machine pair, e.g., M2 and gateway 812; and a second mobile terminal and machine pair e.g., M4 and gateway 812. The PDSCH resource carrying the machine access response message may be indicated by PDCCH with common machine-RA-RNTI. Thus, the related machines and devices would know where to get their own machine access response messages and thereby obtain the pair information and the new machine RNTI. It is noted that the initial access response message may only be sent by the eNB and not the mobile terminal due to hardware constraints.

The eNB may use dynamic or (semi-)persistent scheduling to allocate the resource for machine related transmission. If eNB has the resource partition for machine and cellular transmission, then machines may use a RTS/CTS mechanism to access their machine gateway. If the machine access fails due to collision, the machines may increase the period of time for receiving a machine access response message and/or their busy-signal power level to increase the machine access success ratio.

Technical analysis based upon channel collision probability has been performed to illustrate the benefits of the busy-signal assisted M2M initial access procedure. The performance gained through implementation of the above procedure increased the collision-free probability of 10 users sending busy-signals at the same time from 62% to 78% using 32 sequences, thereby increasing performance. Alternatively, the required resource reservation could be reduced from 32 sequences to 16 sequences while maintaining the same 62% collision-free probability, increasing efficiency without sacrificing existing performance.

Further, access delay can be reduced as once a collision occurs during pre-contention; the machine may detect the collision (by detecting a simultaneous busy-signal) and can initiate the next attempt in the next initial access instant without waiting for the eNB initial access response message to inform the machine that a connection failure occurred.

Figure 9:
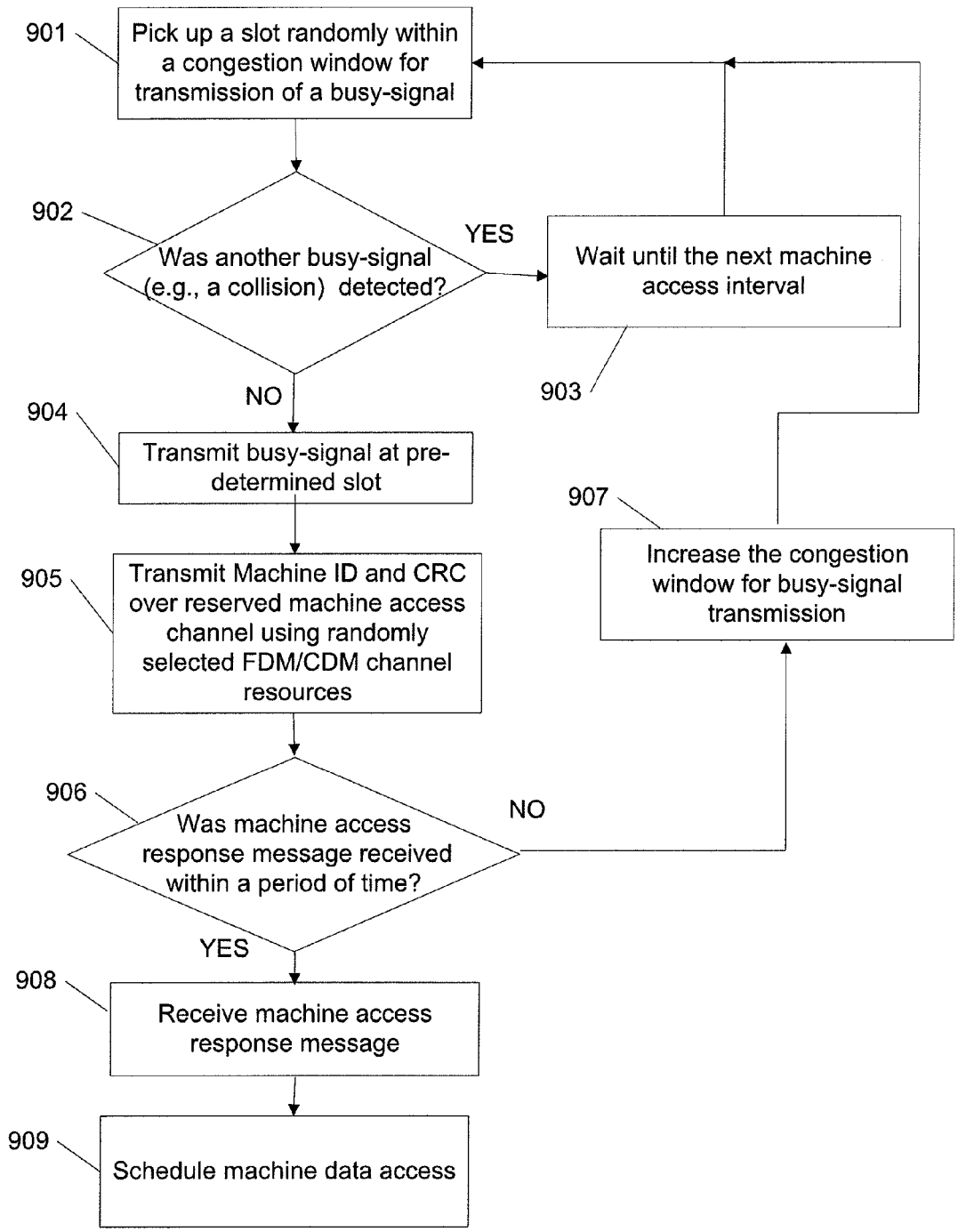
FIG. 9 illustrates a flowchart of a method of providing machine-to-machine communication in a wireless network in accordance with an example embodiment of the present invention.

FIG. 9 is a flowchart diagram showing a method according to an example embodiment of the present invention. At operation 901, the machine selects a slot within the congestion window for transmission of a busy-signal. If the machine detects another busy signal attempting to reserve the same RACH access slot at 902, the machine may then wait until the next machine access interval at 903 to transmit the busy signal again at 901. If no other busy signals were detected at 902, the machine may transmit a busy-signal at the predetermined slot to reserve the slot on the machine access channel at 904. The machine may then transmit the machine ID and CRC using randomly selected FDM/CDM channel resources over the reserved RACH access slot at 905 in the machine access channel reserved by the busy-signal at 904. If the machine does not receive a machine access response message within a period of time at 906, the period of time used may be increased at 907 and a busy signal is transmitted again at 901. If a machine access response message was received within the period of time at 908, the message may contain a common RNTI for the paired gateway and machine as allocated by the eNB. The machine access response message may include RNTI+machine ID+mobile terminal (gateway) RNTI so that the machine and the mobile terminal acting as the machine gateway may know each other by decoding the machine access response message. Then the machine can schedule machine data access at 909.

Figure 10:
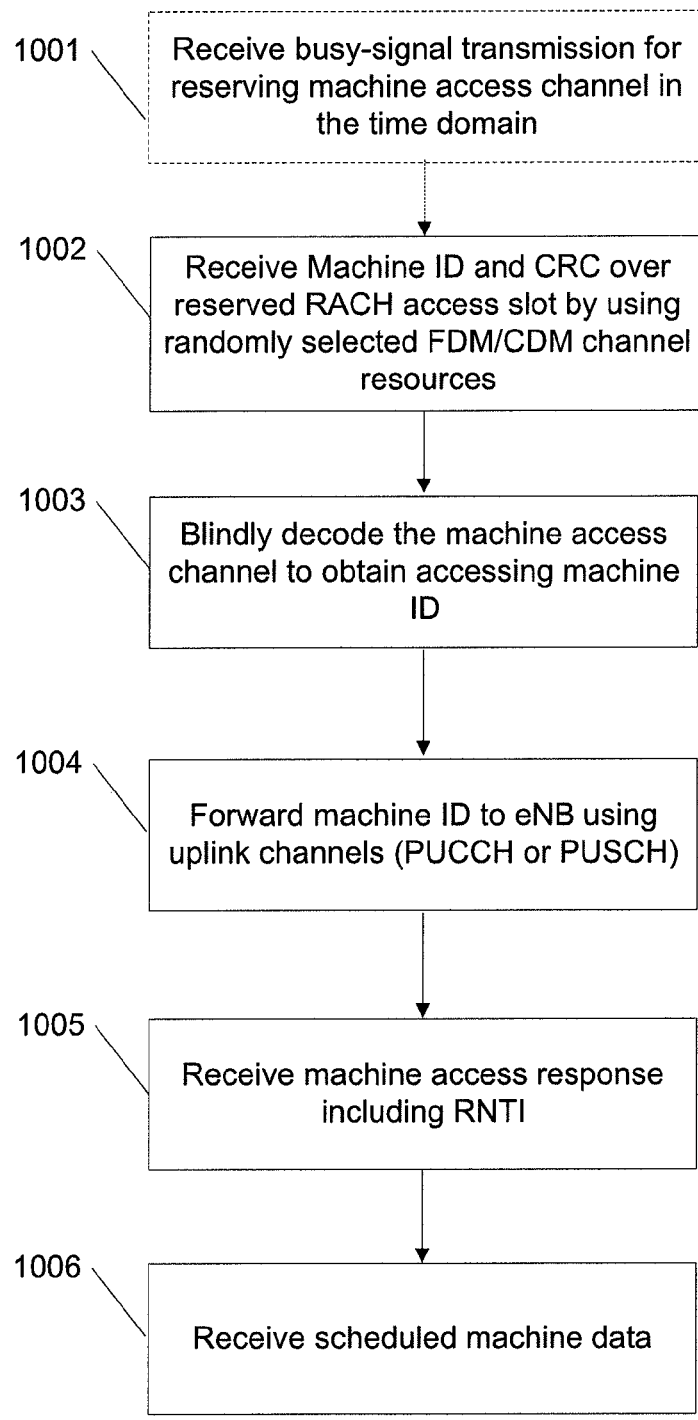
FIG. 10 illustrates a flowchart of a method of providing machine-to-machine communication in a wireless network in accordance with another example embodiment of the present invention.

FIG. 10 is a flowchart diagram showing a method according to another example embodiment of the present invention. Optionally, a busy-signal may be received at 1001 by a machine gateway. The busy-signal may include a unique orthogonal sequence with good auto-correlation properties mapped to K resource elements of the busy signal. The gateway receives the machine ID and CRC via randomly selected FDM/CDM resources over the RACH access slot reserved by the busy-signal at 1002. The gateway may then blindly decode the machine access channel to obtain the accessing machine(s) ID(s) at 1003. The machine ID(s) is then forwarded to the eNB using uplink channels (e.g., PUCCH, PUSCH) at 1004. The gateway may receive the machine access response message at 1005 which may include the gateway RNTI and the allocated RNTI of the machine, together with the machine ID. The machine access response message may form a machine to machine gateway pair such that the gateway and machine know each other for scheduling machine data at 1006.

FIGS. 9 and 10 are flowcharts of systems, methods and program products according to example embodiments of the invention. It will be understood that each block of the flowcharts, and combinations of blocks in the flowcharts, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of an apparatus employing an embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus embody means for implementing the functions specified in the flowchart block(s). These computer program instructions may also be stored in a computer-readable memory that may direct a computer or other programmable apparatus to function in a particular manner, such that the instructions stored in the computer-readable memory produce an article of manufacture the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s).

Accordingly, blocks of the flowcharts support combinations of means for performing the specified functions, combinations of operations for performing the specified functions and program instruction means for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In an example embodiment, an apparatus for performing the methods of FIGS. 9 and/or 10 above may comprise a processor (e.g., the processor 70) configured to perform some or each of the operations (901-909 and/or 1001-1006) described above. The processor may, for example, be configured to perform the operations (901-909 and/or 1001-1006) by performing hardware implemented logical functions, executing stored instructions, or executing algorithms for performing each of the operations. Alternatively, the apparatus may comprise means for performing each of the operations described above. In this regard, according to an example embodiment, examples of means for performing each of operations 901-909 and/or 1001-1006 may comprise, for example, the processor 70, the resource manager 80, and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus comprising:
   at least one processor; and
   at least one memory including computer program code, the at least one memory and the computer program code configured to, with the processor, cause the apparatus to perform at least:
   transmit, to a mobile device, a busy-signal at a machine access time slot of a machine access channel, wherein the apparatus transmits the busy-signal when another busy-signal from a different apparatus is not detected at the machine access time slot, wherein the busy-signal reserves the machine access time slot, and wherein the machine access channel reuses a downlink resource of a cellular network;
   transmit, to the mobile device, an identification at the machine access time slot; and
   receive, directly from an access point and in response to the identification forwarded by the mobile device, a machine access response message including a communications resource assignment for subsequent communications between the apparatus and the mobile device.

2. The apparatus according to claim 1, further configured to at least:
   increase a congestion window before transmitting the identification a second time, wherein the identification is transmitted the second time when the machine access response message is not received within a predetermined period of time.

3. The apparatus according to claim 1, wherein the identification includes a cyclic redundancy check.

4. The apparatus according to claim 1, wherein the identification is transmitted over the machine access time slot by using randomly selected frequency division multiplexed channel resources or randomly selected code division multiplexed channel resources.

5. The apparatus according to claim 1, wherein the busy-signal is time division multiplexed or frequency division multiplexed.

6. The apparatus according to claim 1, wherein the machine access response message includes at least one radio network temporary identifier for a pairing of the apparatus and the mobile device.

7. The apparatus according to claim 1, wherein the machine access response message includes a machine identification.

8. The apparatus according to claim 1, wherein the communications resource assignment comprises one or more of an allocated time slot, an allocated frequency band, and/or an allocated spreading code of a code division multiple access system.

9. The apparatus according to claim 1, wherein an uplink channel is not allocated for communications from the mobile device to the apparatus.

10. The apparatus according to claim 1, wherein a plurality of apparatus communicate with the mobile device over the machine access channel.

11. The apparatus according to claim 1, wherein the machine access time slot comprises a random access channel of the access point.

12. A method comprising:
    transmitting, to a mobile device, a busy-signal at a machine access time slot of a machine access channel, wherein an apparatus transmits the busy-signal when another busy-signal from a different apparatus is not detected at the machine access time slot, wherein the busy-signal reserves the machine access, and wherein the machine access channel reuses a downlink resource of a cellular network;
    transmitting, to the mobile device, an identification at the machine access time slot; and
    receiving, directly from an access point in response to the identification forwarded by the mobile device, a machine access response message including a communications resource assignment for subsequent communications between the apparatus and the mobile device.

13. The method according to claim 12, further comprising:
    increasing a congestion window before transmitting the identification a second time, wherein the identification is transmitted the second time when the machine access response message is not received within a predetermined period of time.

14. The method according to claim 12, wherein the identification includes a cyclic redundancy check.

15. The method according to claim 12, wherein the identification is transmitted over the machine access time slot by using randomly selected frequency division multiplexed channel resources or randomly selected code division multiplexed channel resources.

16. The method according to claim 12, wherein the busy-signal is time division multiplexed or frequency division multiplexed.

17. The method according to claim 12, wherein the machine access response message includes at least one radio network temporary identifier for a pairing of the apparatus and the mobile device.

18. The method according to claim 12, wherein the machine access response message includes a machine identification.

19. The method according to claim 12, wherein the communications resource assignment comprises one or more of an allocated time slot, an allocated frequency band, and/or an allocated spreading code of a code division multiple access system.

20. The method according to claim 12, wherein an uplink channel is not allocated for communications from the mobile device to the apparatus.

21. The method according to claim 12, wherein a plurality of apparatus communicate with the mobile device over the machine access channel.

22. The method according to claim 12, wherein the machine access time slot comprises a random access channel of the access point.

* * * * *